United States Patent
Renard et al.

[19]

[11] Patent Number: 6,074,015
[45] Date of Patent: Jun. 13, 2000

[54] SOUND ABSORBING WHEEL

[75] Inventors: Etienne Renard, Riom; Myriam Peyronne, Troyes, both of France

[73] Assignee: Compagnie General des Etablisse-ments Michelin-Michelin & Cie, Clermont-Ferrand Cedex, France

[21] Appl. No.: 09/227,472

[22] Filed: Jan. 8, 1999

Related U.S. Application Data

[63] Continuation of application No. PCT/EP97/03685, Jul. 11, 1997.

[30]  Foreign Application Priority Data

Jul. 15, 1996 [FR] France ................................. 96 08917

[51] Int. Cl.⁷ ......................................................... B60B 3/00
[52] U.S. Cl. ........................... 301/6.91; 301/63.1; 301/95; 295/7
[58] Field of Search ................... 301/6.91, 63.1, 301/95, 96, 97, 98, 64.2, 64.3; 295/7; 181/207; 74/574

[56]  References Cited

U.S. PATENT DOCUMENTS

| 2,057,565 | 10/1936 | Eksergian | 301/63.1 X |
| 2,083,325 | 6/1937 | Farr | 301/97 X |
| 3,627,382 | 12/1971 | Lejeune | . |
| 4,165,131 | 8/1979 | Thompson | 301/65 |
| 4,181,364 | 1/1980 | Reppert | 301/63.1 X |

FOREIGN PATENT DOCUMENTS

| 800935 | 7/1936 | France . |
| 2457907 | 6/1976 | Germany . |
| 3241056 | 5/1984 | Germany . |
| 3328135 | 2/1985 | Germany . |
| 4087803 | 3/1992 | Japan . |
| 6106903 | 4/1994 | Japan . |

*Primary Examiner*—Russell D. Stormer
*Attorney, Agent, or Firm*—Baker Botts L.L.P.

[57]  ABSTRACT

A rim and disk type wheel which is mechanically reinforced to raise the frequencies of several of the vibration modes of the wheel to attenuate the running noises heard in the passenger space.

12 Claims, 9 Drawing Sheets

SOUND ABSORBING WHEEL

This is a continuation of PCT/EP 97/03685, filed Jul. 11, 1997.

BACKGROUND OF INVENTION

The invention concerns a vehicle wheel and, in particular, a wheel having special sound absorbing properties.

When a vehicle travels over a road, its driver and passengers are placed in the passenger space in a very noisy environment. It is a constant concern of automobile manufacturers to limit the sound level of their vehicles as much as possible.

The sources of these noises in the passenger space are highly varied. They include noises due to the engine, or of aerodynamic origin, or linked to the various hydraulic pumps or running noises of the tires on the road.

The latter originate from shocks sustained on rolling by the tire treads and solidly transmitted to the vehicle passenger space. Such noises come within a very wide frequency range of between 80 and 800 Hz, with, notably, peaks toward 250 Hz. These noises are called "body hum."

In this frequency range, one encounters, in particular, a natural mode of vibration of the air toroid of the inner cavity of the tire as well as four natural modes of vibration of ordinary wheels.

A great deal of research has been undertaken to try to limit the noise heard in the passenger space of vehicles. For example, patent application JP 4-87803 proposes introducing a wall in the inner cavity of the tire in order to divide the inner air toroid in two, substantially altering its modes of vibration by shifting them beyond 500 Hz and thus lower the peaks of the body hum in the passenger space at around 250 Hz.

Another mode of action is described in application JP 6-106903. This application proposes inserting a sound absorbing element in the inner cavity of the tire, such as a foam, in order to attenuate the vibrations due to resonance of the air toroid.

These applications have not yet been put to any industrial use to date; consequently, the problem of effectively reducing the noise heard in the passenger space of a vehicle is still very much present.

SUMMARY OF THE INVENTION

By defining below the "interior" and "exterior" axial orientations relative to the mid-plane of a wheel, the "curved nozzle" of a wheel disk is understood to be the axially outermost part of the disk (see FIG. 1).

The invention concerns a method of raising the frequencies of several of the natural modes of vibration of a vehicle wheel comprising a rim and a disk, in which the circumferential zone forming the curved nozzle of said wheel is mechanically reinforced.

According to a first embodiment, the thickness of the disk in its axially outermost part is 10 to 150% greater than the thickness of the other parts of the disk.

According to a second embodiment, a continuous ring is fastened to the curved nozzle of the disk. The ring is preferably arranged on the inner axial side of the wheel disk, but it can also be placed on the outer axial side.

A set of reinforcing elements, such as a discontinuous ring, can also be axially fastened internally or externally to the curved nozzle of the disk.

As will be explained below, a wheel according to the invention, the disk of which is mechanically reinforced at its curved nozzle relative to an ordinary mechanically optimized wheel profile, presents at least two of its natural modes of vibration shifted to the high frequencies.

But this wheel also has the advantage of making possible an appreciable attenuation of the body hum heard in the passenger space of a vehicle equipped with such wheels.

A wheel according to the invention can also contain a mechanical link between the disk and the rim reinforced beyond what is strictly necessary to withstand the rolling stresses in order to raise the frequencies of several of the natural modes of vibration of said wheel.

The advantage of this embodiment of the invention is to increase the efficiency of absorption of the body hum in the passenger space of a vehicle.

DESCRIPTION OF THE DRAWINGS

Several embodiments of the invention are presented nonlimitatively, based on the following figures.

DESCRIPTION OF PREFERRED EMBODIMENTS

Figure 1:
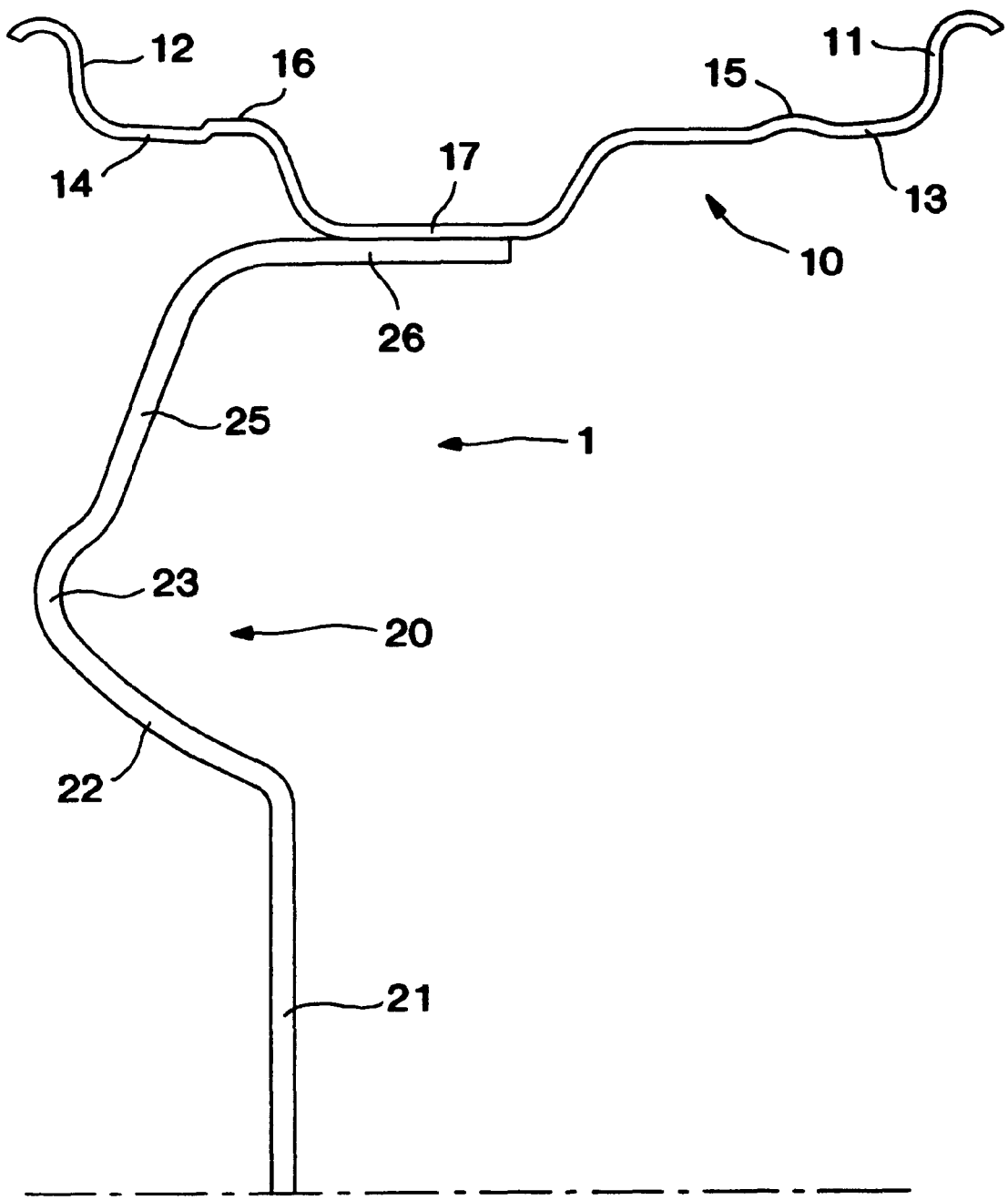
FIG. 1 represents a half-section of a conventional sheet steel passenger car wheel.

FIG. 1 represents a conventional passenger car steel sheet wheel 1 of reference "5 1/2Jx14CHA-4-36." This wheel comprises a rim 10 and a disk 20. Taking as reference the position of the disk 20 relative to the mid-plane of the wheel 1, in order to define the axially outer and inner sides, the rim 10 presents two flanges, inner 11 and outer 12; two seats, inner 13 and outer 14; two anti-unseating bosses or "humps," inner 15 and outer 16; and a rim cavity 17.

The disk comprises a hub bearing 21, a curved basin 22, a curved nozzle 23, a perforated zone 25 and a joinder zone 26 under the rim well 17. The curved nozzle 23 is the axially outermost part of the disk.

The wheel has a mechanically optimized profile and is made by steel sheet stamping. Consequently, the thicknesses of the different parts of the disk 20 and of the rim 10 are appreciably constant.

When such wheel is mechanically excited, it can go into resonance according to several natural modes of vibration. These natural modes are determined by fixing the wheel to a seismic block, for example, and then exciting it by a shock with a dynamometric hammer, registering the relative acceleration on said excitation by means of accelerometers and calculating the transfer function γ/F=ƒ(ν), where γ is the acceleration measured in m/s², F the force of the shock imposed in newtons, and ν the vibration frequency in hertz.

Figure 2:
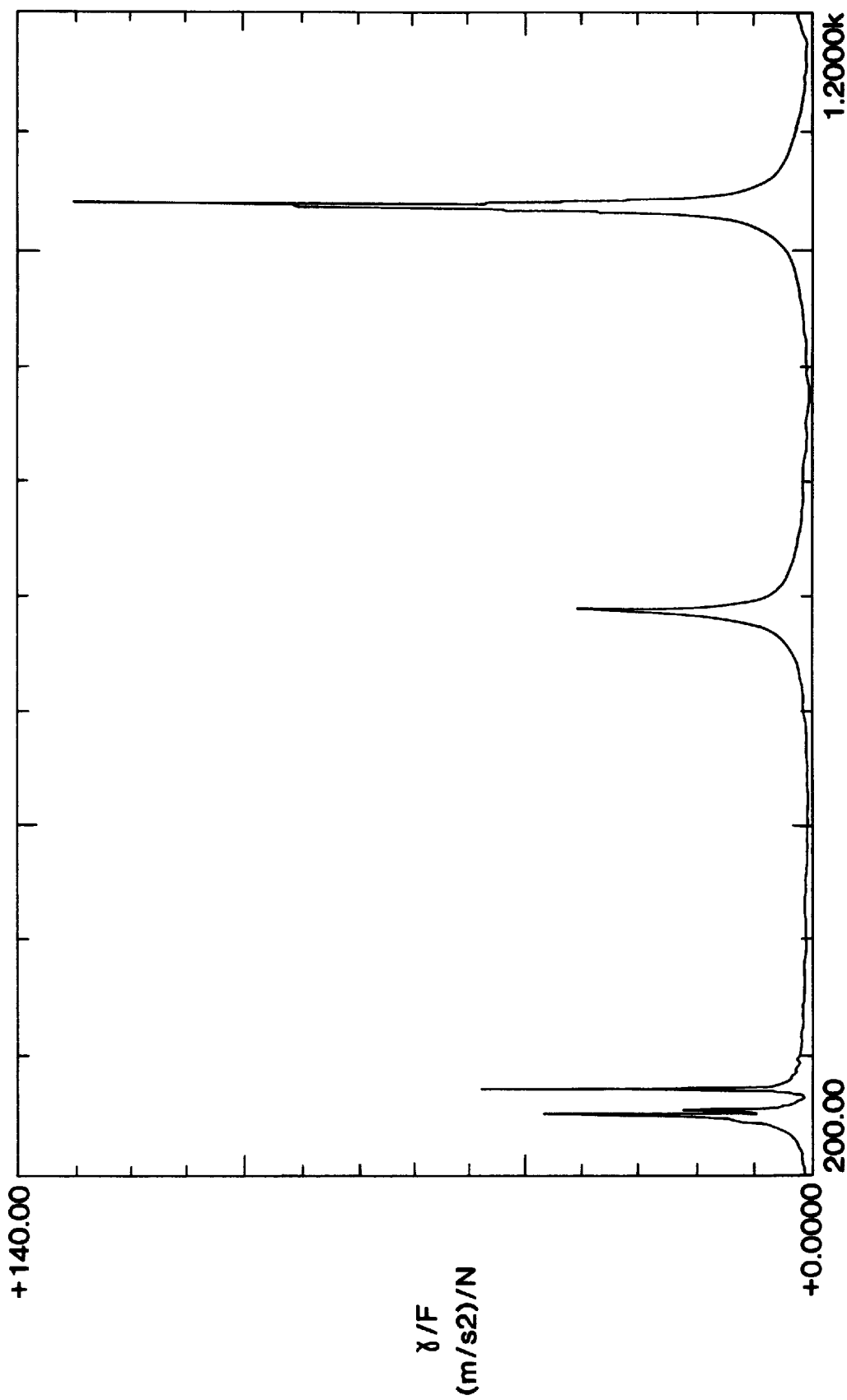
FIG. 2 presents the vibration response of a wheel to a shock excitation.

FIG. 2 presents such a curve γ/F=ƒ(ν) for the wheel of FIG. 1. On said curve, the presence of four peaks in the 80–800 Hz range can be observed. These peaks correspond to the four ordinary natural modes of vibration of the wheel in that frequency range.

These natural modes of vibration are now described by means of FIGS. 3 to 6 from a numerical simulation. The figures present in perspective: at (a), the nondeformed wheel and at (b), the wheel with a markedly amplified deformation corresponding to one of the natural modes.

There are two natural disk modes, so called because it is mainly disk 20 which is deformed.

Figure 4A:
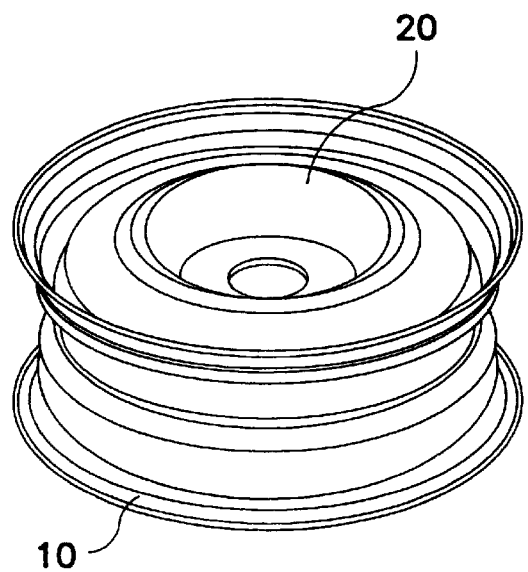
Figure 4B:
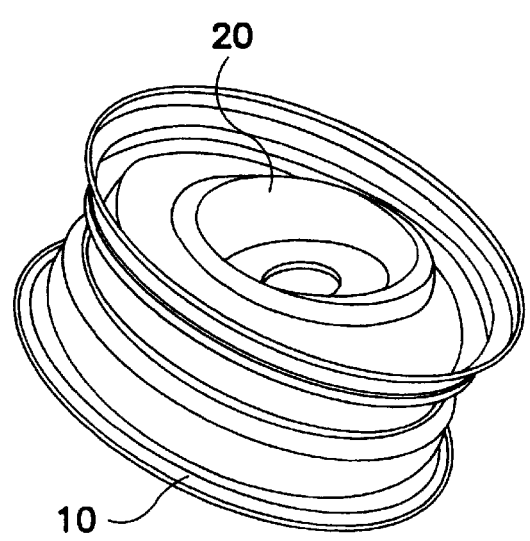
Figure 5A:
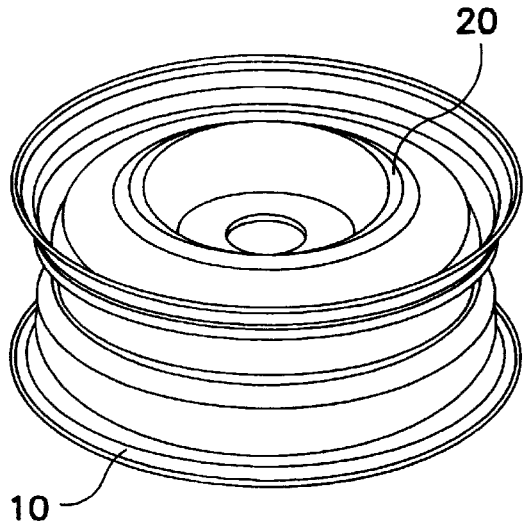
Figure 5B:
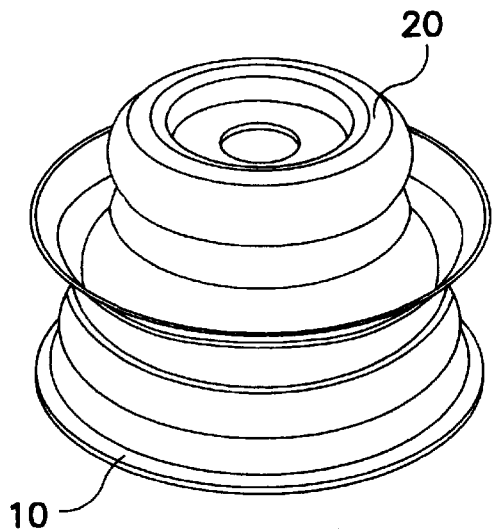
Figure 6A:
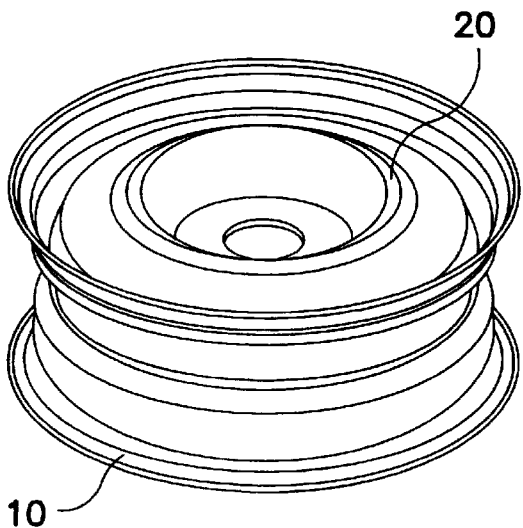
Figure 6B:
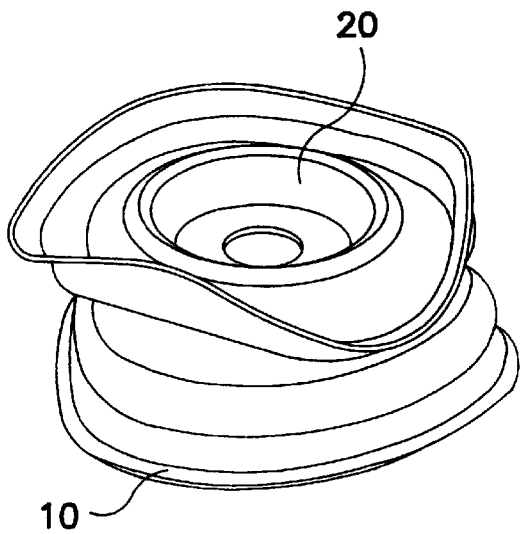

The first natural disk mode, called swing mode of the disk, is presented in FIG. 4. That natural mode is situated toward 271 Hz and corresponds to the swing of the rim 10 on an axis lying within the hub bearing plane of the disk 20.

The second natural disk mode, called pumping mode (FIG. 5), is situated toward 513 Hz. This natural mode corresponds to a pumping movement of the disk 20, which is axially deformed on both sides of the rim 10.

In the other two natural modes, it is mainly the rim which is deformed. They are called rim modes.

Figure 3A:
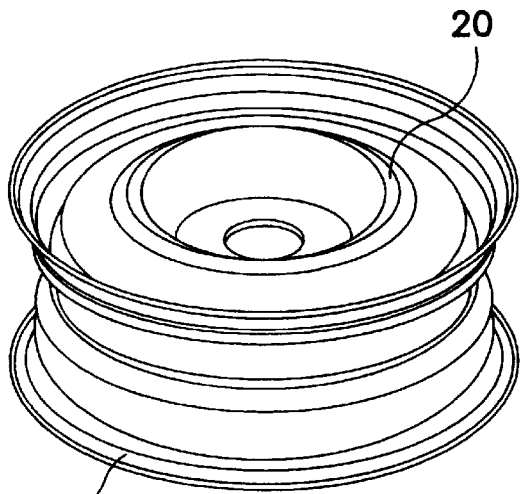
FIGS. 3 to 6 illustrate the four ordinary modes of vibration of the wheel of FIG. 1, with a nondeformed wheel at (a) and the same wheel with an amplified deformation at (b)
Figure 3B:
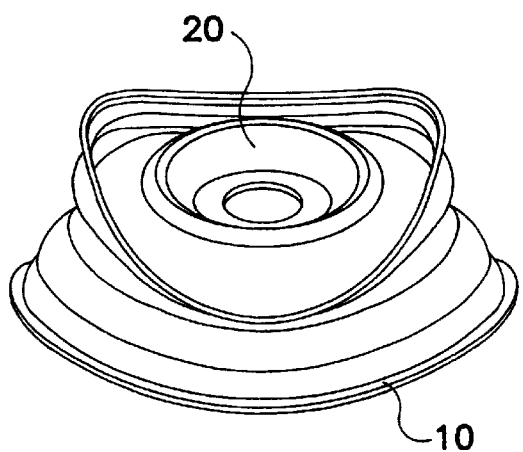

FIG. 3 presents the first natural rim mode, in which an ovalization of the two rim flanges is observed in phase opposition. Said natural mode is situated toward 250 Hz and is called harmonic ovalization mode 2.

The second natural rim mode (FIG. 6) is situated toward 670 Hz. It again corresponds to an ovalization of the two rim flanges in phase opposition, but of higher order. It is called harmonic ovalization mode 3.

The body hum analysis test on the vehicle is carried out by placing a mannequin equipped with microphones in the passenger space of a vehicle. The output signals of the microphones are registered and analyzed in acoustic power, globally and in octave third bands. The results of a test are presented by variation of the acoustic powers of the solution tested relative to the acoustic powers of a reference.

Figure 7:
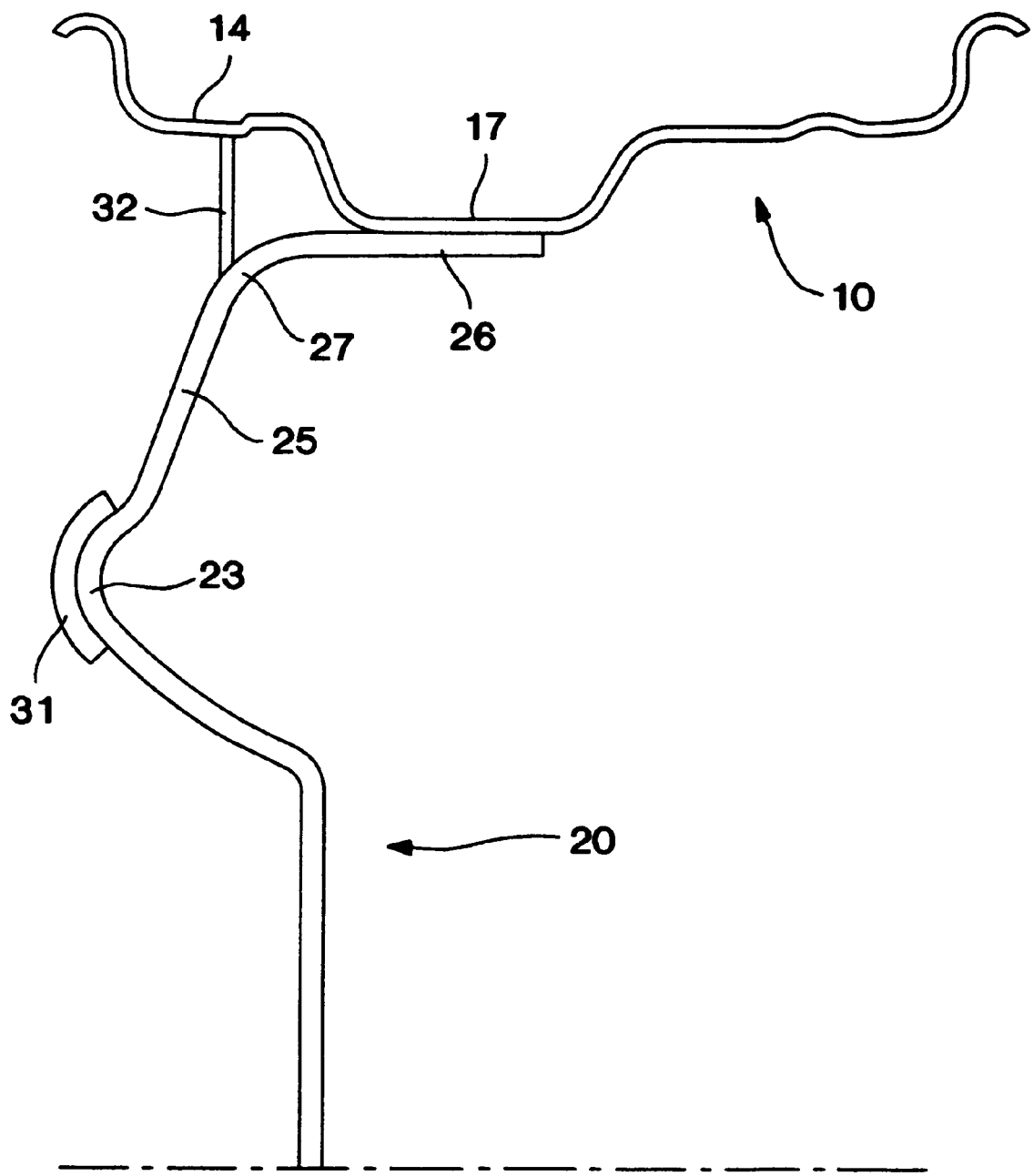
FIG. 7 shows a wheel with a curved nozzle reinforcement and a disk/rim link reinforcement.

FIG. 7 shows a wheel 1 equipped with two reinforcements according to the invention. The reinforcement 31 of curved nozzle 23 is an arched ring assembled by bonding and welding on the outer wall of said curved nozzle 23. This reinforcement 31 has a thickness identical to that of the other parts of the disk 20. Consequently, the total thickness of the curved nozzle 23 is doubled here relative to the normal thickness of the curved nozzle 23 of the wheel 1 of FIG. 1.

The disk/rim link reinforcement 32 is a straight ring two millimeters thick, welded under the outer seat 14 on one side and at the link 27 between the joinder zone 26 under the well 17 and the perforated zone 25.

Three wheels were tested with these reinforcements:

(a) wheel S1 with a curved nozzle 23 reinforcement 31;

(b) wheel S2 with a disk/rim link reinforcement 32; and (c) wheel S3 with a curved nozzle 23 reinforcement 31 and a disk/rim link reinforcement 32.

These wheels were compared to the wheel 1 referred to as R, shown in FIG. 1 without reinforcement.

Analysis of the natural modes of vibration yielded the results presented in Table 1 below.

TABLE 1

| Wheel | Swing Mode (Hz) | Pumping Mode (Hz) | Ovalization Mode H2 (Hz) | Ovalization Mode H3 (Hz) |
|---|---|---|---|---|
| R | 271 | 513 | 250 | 670 |
| S1 | 336 | 621 | 255 | 681 |
| S2 | 265 | 509 | 324 | 853 |
| S3 | 334 | 651 | 320 | 770 |

This table shows that the curved nozzle 23 reinforcement 31 results in appreciably shifting to the high frequencies the two natural modes of vibration of the disk, the swing mode (+65 Hz) and the pumping mode (+108 Hz). On the other hand, its effect on the two natural modes of the rim is almost nil (+5 Hz, +11 Hz).

The results of wheel S2 show that, in contrast to wheel S1, the disk/rim link reinforcement 32 has practically no effect on the two natural modes of the disk (-6 Hz, -4 Hz), but appreciably shifts the two natural modes of the rim (+74 Hz, +72 Hz).

It is observed, finally, that wheel S3 logically has all of its natural modes of vibration shifted to the high frequencies (from 63 to 138 Hz).

A vehicle test was carried out to determine whether those different wheels modified or not the intensity of the running noises heard in the passenger space of the vehicle, the body hum. The vehicle was a Renault Megane equipped with four identical wheels corresponding to the solution tested with Michelin MXT E tires, test speed: 80 km/h.

Table 2 presents the results of the overall analysis of the tests performed.

TABLE 2

| Wheel | S1 | S2 | S3 |
|---|---|---|---|
| P − P$_R$dB(A) | −0.55 | 0.00 | −0.65 | with P mean acoustic power of the solution tested, and P$_R$ mean acoustic power of the reference wheel R.

Table 2 shows a remarkable result for wheel S1, which makes possible an overall attenuation of 0.55 dB(A). Such attenuation of the body hum is very appreciable. On the other hand, wheel S2 has no overall efficiency. Finally, the result of wheel S3 confirms the efficiency of the curved nozzle reinforcement 31, but also indicates a synergy between the two reinforcements 31, 32, since the overall attenuation of that wheel is 0.65 dB(A).

Figure 8:
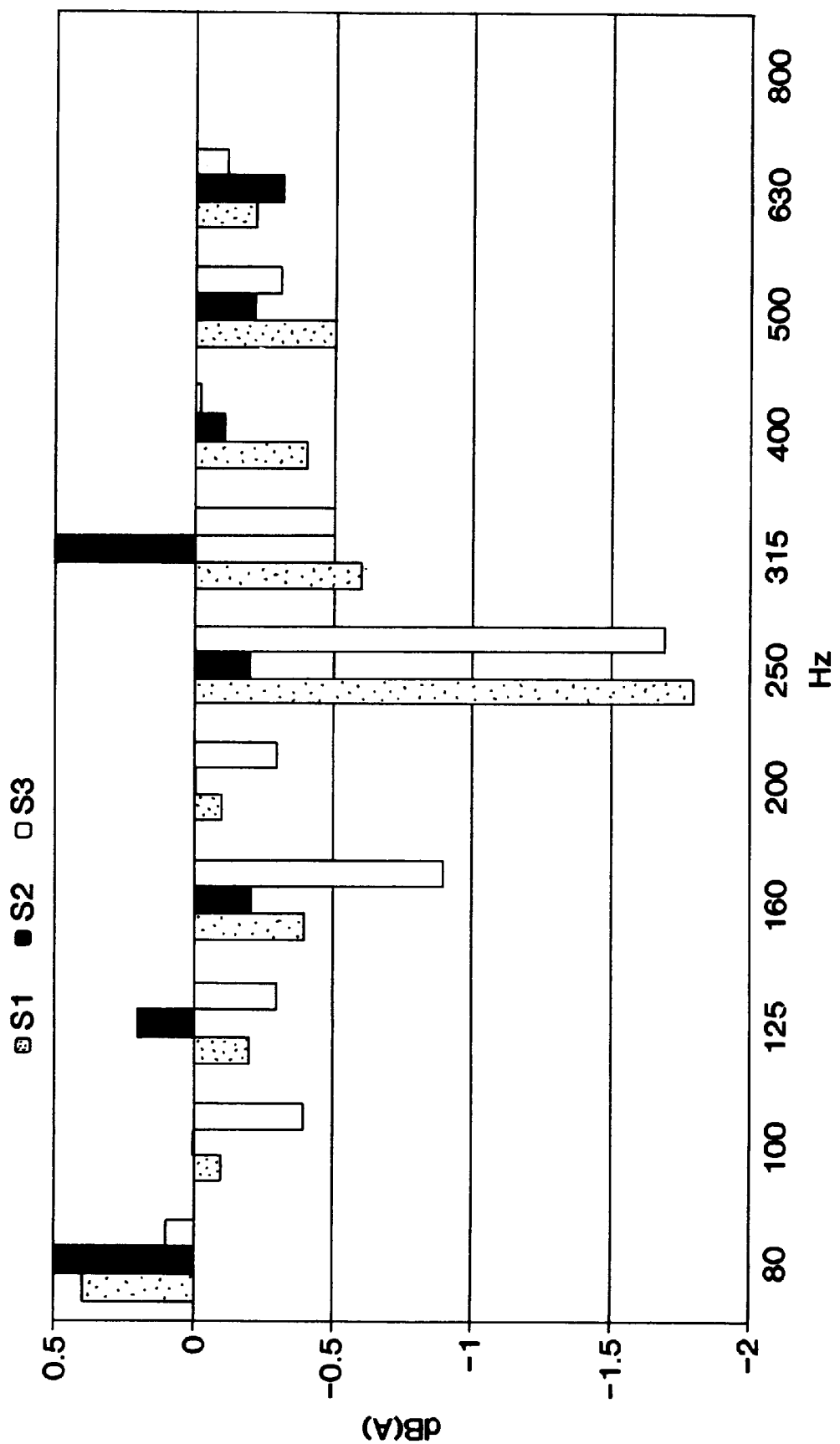
FIG. 8 presents the results of octave third band analysis of a vehicle wheel test according to the invention.

FIG. 8 presents the results of the octave third band analysis of the preceding vehicle test.

The most important result of this figure is, in addition to confirmation of the overall analysis, the fact that the attenuation observed exceeds 1.5 dB(A) for the two wheels S1 and S2 in the center band of 250 Hz, the band where body hum peaks are situated.

This result shows that the wheels according to the invention, equipped with at least one curved nozzle 23 reinforcement 31, make it possible effectively and very substantially to attenuate the body hum heard in the passenger space of a vehicle.

Without departing from the scope of the invention, numerous other embodiments of reinforcements can be used.

In particular, applicant observed that, starting from a 10% increase in thickness of the curved nozzle 23, a significant increase of vibration frequency of the two natural modes of the disk was obtained. On the other hand, it does not seem advisable to exceed an increase in thickness of around 150% because of the extra weight that would be created.

FIGS. 9 to 12 present other embodiments of the invention.

Figure 9:
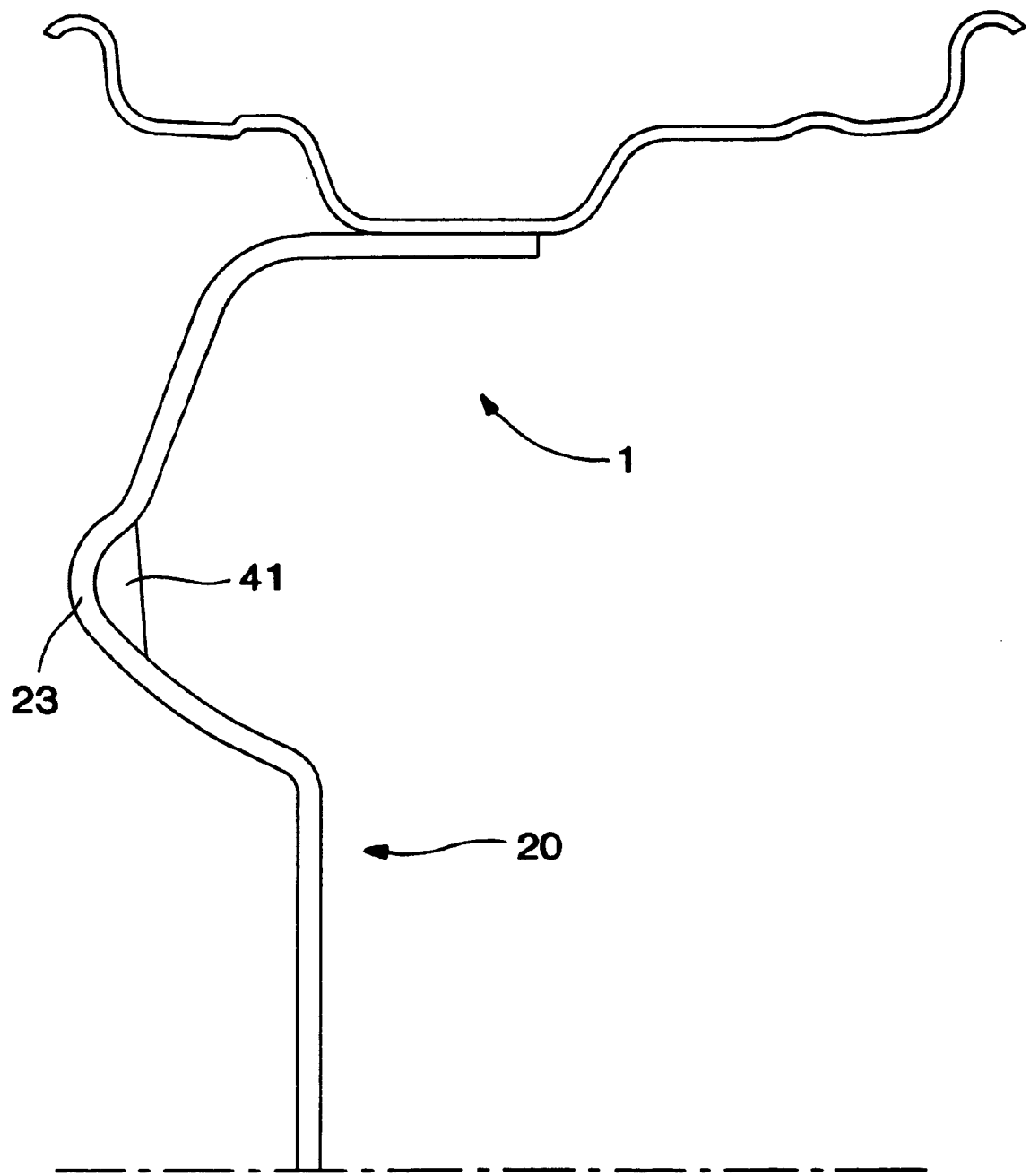
FIG. 9 shows a wheel with an internally axially arranged curved nozzle.

In FIG. 9, a wheel 1 is shown, the disk 20 of which contains an internally axially arranged continuous curved nozzle 23 reinforcement 41. Such a wheel disk can be obtained by welding said reinforcement 41 after or during stamping of the steel or aluminum sheet wheel disk. An equivalent disk can also be obtained by variation of thickness of the disk in the zone of the curved nozzle 23 by steel or aluminum sheet flow turning or planishing processes. Such wheel disks can also belong to wheels made by casting or forging followed, if necessary, by a machining until obtaining the desired profile.

Figure 10:
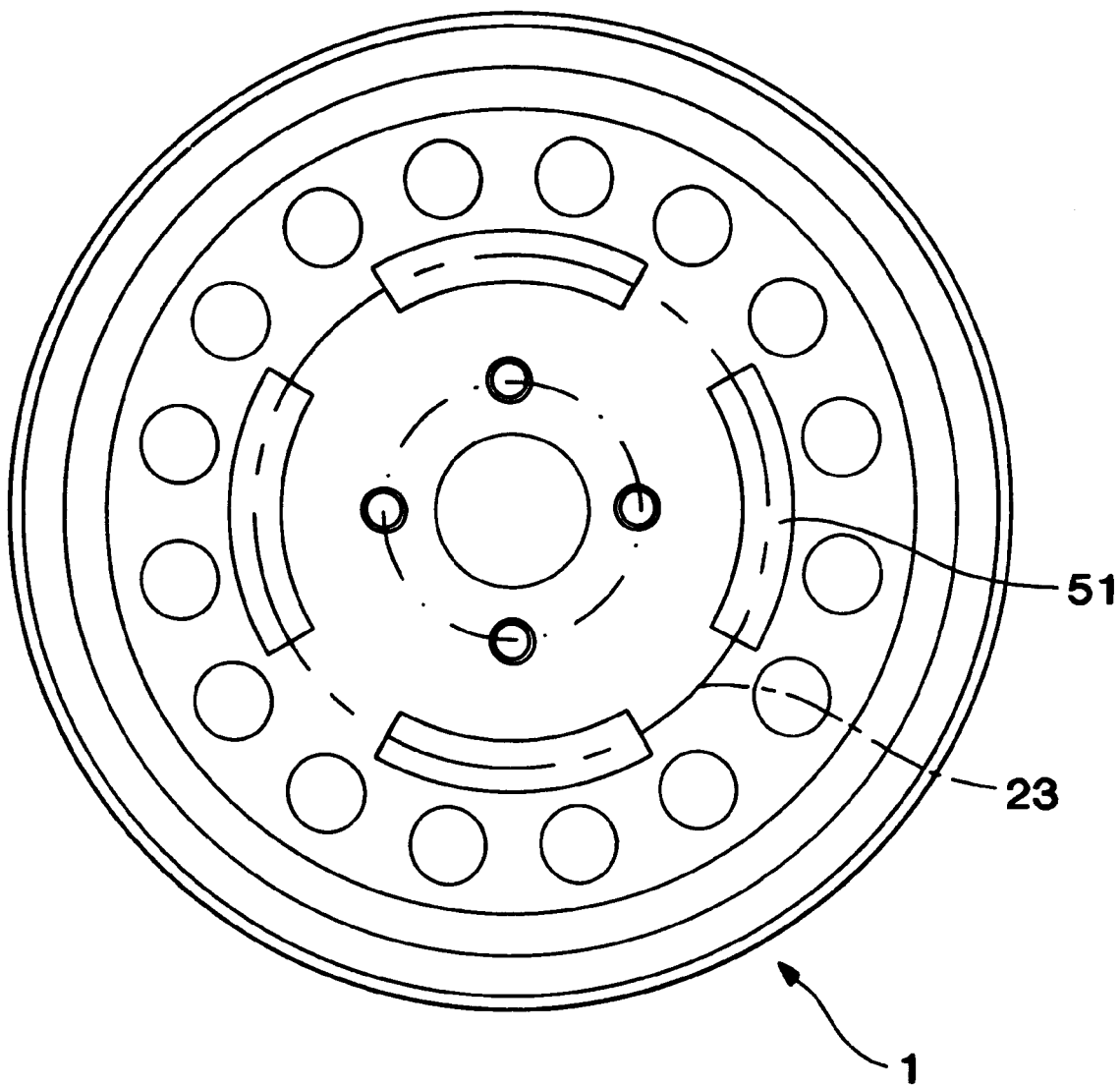
FIG. 10 shows a wheel with a discontinuous curved nozzle reinforcement.

The reinforcements can also be discontinuous, such as those shown in FIG. 10. This figure shows a side view of a passenger car wheel 1 containing, at the curved nozzle 23, four reinforcements 51 evenly distributed on the circumference.

Figure 11A:
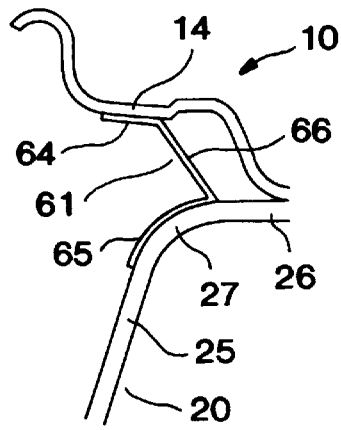
FIG. 11 presents several embodiments (a), (b), (c) of disk/rim link reinforcements.
Figure 11B:
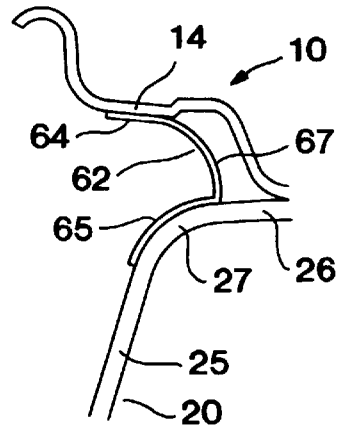
Figure 11C:
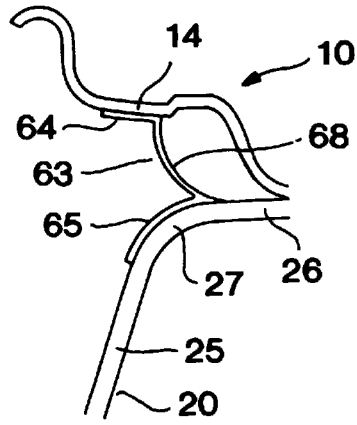

FIG. 11 shows a wheel 1 equipped with disk/rim link reinforcements. In FIG. 11 (*a*), the disk/rim link reinforcement 61 is a straight ring 66 with two support elements 64 against the seat 14 of the rim 10 and 65 against the zone of connection 27 between the joinder zone 26 and the perforated zone 25 of the disk 20. The reinforcement 62 of FIG. 11 (*b*) contains, as previously, a ring 67 with two support elements 64 and 65. In this example, the ring 67 is arched with a concavity turned toward the outside of the disk 20. Finally, the reinforcement 63 of FIG. 11 (*c*) has an arched ring 68, the concavity of which is turned toward the inside of the disk 20. These three disk/rim link reinforcements very appreciably shift the two natural modes of vibration of the rim toward the high frequencies, but the most marked shifts are obtained with the reinforcement 63 of FIG. 11 (*c*), the concavity of which is turned toward the inside.

Figure 12:
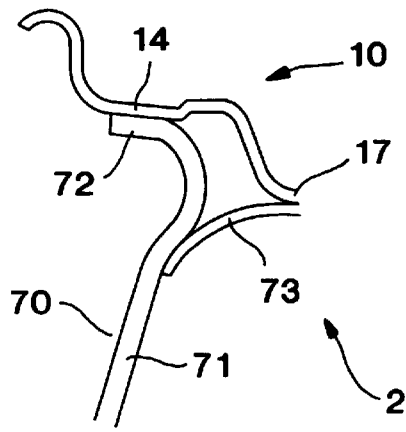
FIG. 12 shows another embodiment of a disk/rim link reinforcement in the case of a disk/rim assembly under the seat.

FIG. 12 presents a wheel 2 equipped with another example of a disk/rim link reinforcement 73. In this case, the disk 70 is assembled under the outer seat 14 of the rim 10 with a concavity of the joinder zone 72 turned toward the outside of the disk 70. The reinforcement 73 joins the radially outer end of the perforated zone 71 of the disk 70 and the rim well 17. This solution is particularly effective in terms of shifting the natural modes of vibration of the rim.

We claim:

1. A vehicle wheel comprising a rim made of metal sheet with an exterior flange, an exterior seat, a rim cavity, an interior seat and an interior flange, and a disk made of metal sheet with a hub bearing, a curved basin, a curved nozzle, a perforated zone and a jointing zone welded to the rim, and reinforcing means at the curved nozzle of the disk and rim-disk link reinforcing means between the rim and the disk, said reinforcing means serving to increase the frequency of some of the natural vibrations of the vehicle wheel.

2. A vehicle wheel according to claim 1, wherein said jointing zone of the disk is welded at the cavity of the rim and the rim-disk link reinforcement means are arranged between the outer seat of the rim and the zone of connection between the perforated zone and the jointing zone of said disk.

3. A vehicle wheel according to claim 2, wherein, the rim-disk link reinforcement means includes an arched ring between said rim seat and said disk.

4. A vehicle wheel according to claim 3, wherein said ring has a concavity turned toward the inside of the disk.

5. A vehicle wheel according to claim 1, wherein said jointing zone of the disk is welded at the outer seat of the rim and the rim-disk reinforcement means is a ring arranged between the rim cavity and the radially outer end of the perforated zone of said disk.

6. A vehicle wheel according to claim 1, wherein said curved nozzle reinforcement means is an increase of the thickness of the disk, so that it is 10 to 150% greater in thickness than the other parts of the disk.

7. A vehicle wheel according to claim 1, wherein said curved nozzle reinforcement means include a continuous ring fastened to the curved nozzle of the disk.

8. A vehicle wheel according to claim 1, wherein said curved nozzle reinforcement means include a set of reinforcing elements fastened to the curved nozzle of the disk.

9. A vehicle wheel according to claim 1, wherein the disk and the rim are made from a steel sheet.

10. A vehicle wheel according to claim 1, wherein the disk and rim are made from an aluminum sheet.

11. A vehicle wheel according to claim 6, wherein the disk is made by stamping.

12. A vehicle wheel according to claim 6, wherein the disk is made by flow turning.

\* \* \* \* \*